United States Patent [19]

Gregory et al.

[11] 4,427,024
[45] Jan. 24, 1984

[54] FLEXIBLE STANDPIPE AND SUBSURFACE PRESSURE SEAL

[76] Inventors: Michael A. Gregory, 3310 N. Clifton, Chicago, Ill. 60657; Glenn N. Traeger, 945 NE. Hazelfern, Portland, Oreg. 97232

[21] Appl. No.: 296,316

[22] Filed: Aug. 26, 1981

[51] Int. Cl.³ ............................................. F16L 5/00
[52] U.S. Cl. ................................. 137/362; 137/403; 137/593; 285/158; 141/287
[58] Field of Search ............... 137/362, 593, 403, 357; 52/58, 220, 302; 285/10, 158; 74/18.2; 141/287, 312

[56] References Cited

U.S. PATENT DOCUMENTS

| 576,945 | 2/1897 | Brenneman | 134/166 C |
| 1,762,190 | 6/1930 | Noe et al. | 137/362 |
| 1,893,979 | 1/1933 | Barrere | 134/166 C |

FOREIGN PATENT DOCUMENTS 1287872 9/1972 United Kingdom ................. 141/287

*Primary Examiner*—Alan Cohan
*Assistant Examiner*—Sheri Novack
*Attorney, Agent, or Firm*—Wood, Dalton, Phillips, Mason & Rowe

[57] ABSTRACT

An expansible, resilient receptacle positionable about a standpipe installed for the relief of subsurface water pressure occasioned specifically by sewer backup. The receptacle surrounds the standpipe and communicates with the inner portion thereof through strategically located openings in the walls of the standpipe. The water introduced to the receptacle bulges its walls and urges a watertight engagement between the walls and floor about the base of the standpipe. The seal contains any water leaking upwardly around the base of the standpipe and prevents the floor from failing. In the event the excessive subsurface water pressure is encountered, the water is permitted to escape into the room to avoid possible rupture of the floor surface. The water is releaseable from the receptacle when the subsurface pressure diminishes.

11 Claims, 7 Drawing Figures

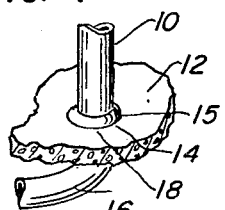
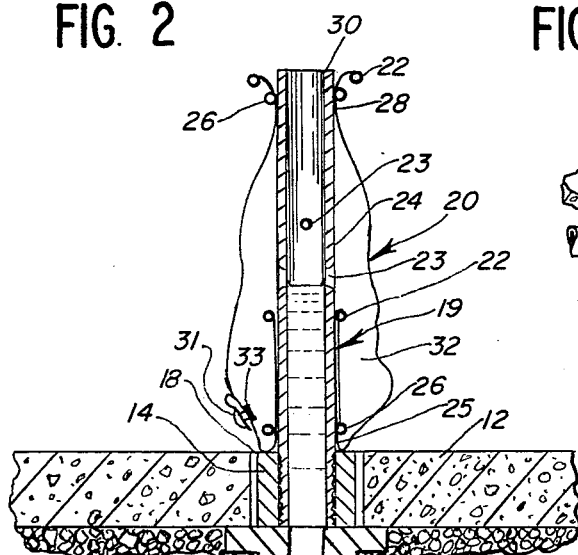 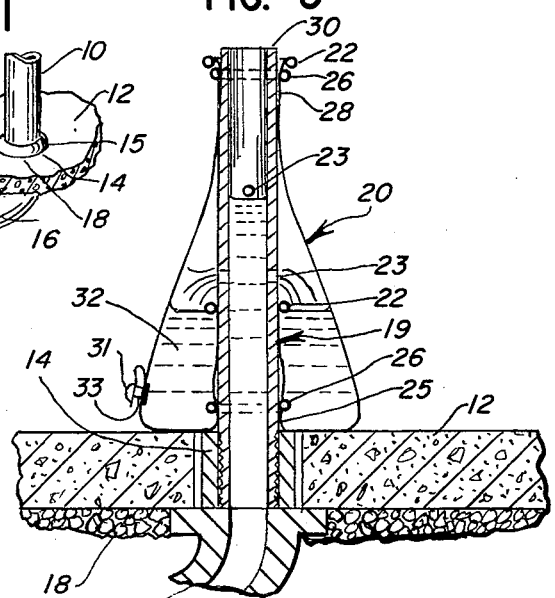
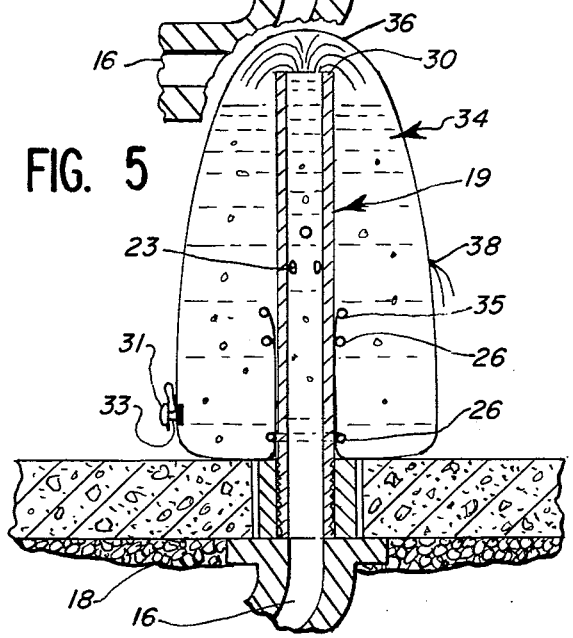 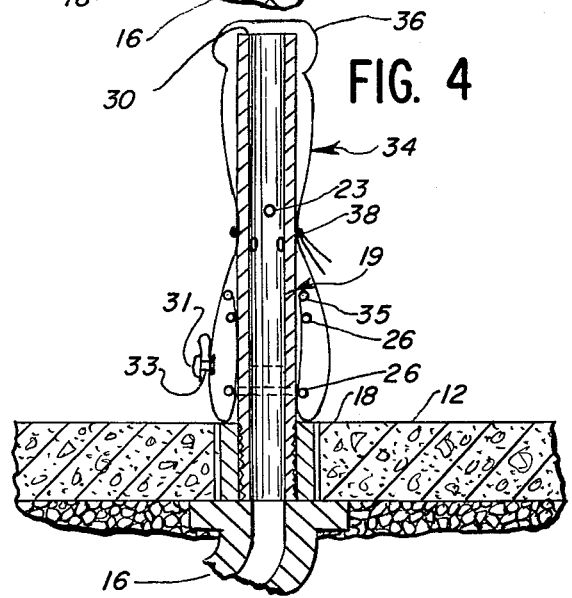
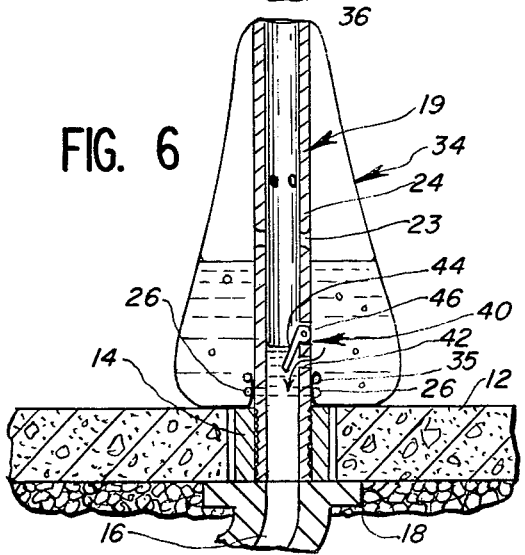 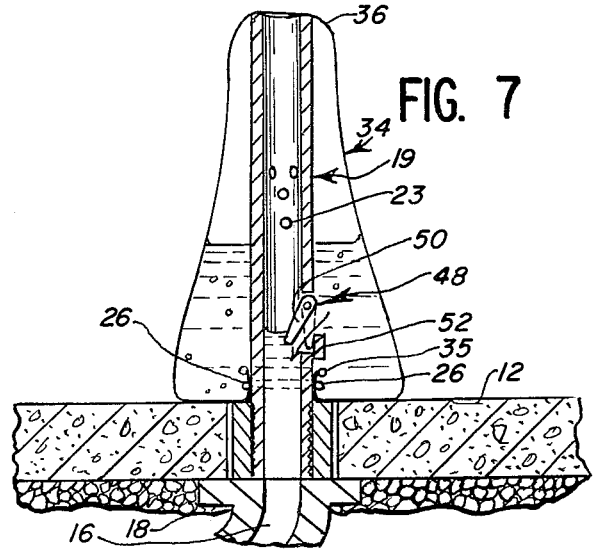

FLEXIBLE STANDPIPE AND SUBSURFACE PRESSURE SEAL

BACKGROUND OF THE INVENTION

Standpipes are traditionally installed in cellars, basements, or other low points in buildings to prevent water backup in sewer drains incident to heavy rain, thawing, or run off. An upright pipe is extended upwardly from a sewer pipe or a region in the subsurface generally as high as two to three feet above the floor surface. A coupling member is embedded in the floor and receives the standpipe threadably, or in any other suitable manner.

Two problems are most prevalent in the prior art standpipe construction. First, leaks often develop around the base of the standpipe which causes flooding in the surrounding area. Second, when the standpipe is too tall, the subsurface pressure may rupture the floor before pressure relief is afforded at the top of the standpipe.

U.S. Pat. No. 2,891,575, issued to A. Moeller, addresses the leakage problem. In Moeller, a stopper portion, consisting of a compressible resilient body, is inserted into a recessed sewer drain bowl. The body is compressed by means of an elongated adjusting rod, which extends up the length of the standpipe, until the expanded body makes leakproof engagement with the drain bowl. The only pressure relief afforded is by the air escape openings adjacent the top of the standpipe.

An alternate standpipe construction is shown in U.S. Pat. No. 2,478,976, issued to C. Modlin. Modlin discloses a series of axially aligned telescoping standpipe segments. Under normal conditions, the standpipe does not protrude above the floor level. The sections are extended progressively in response to an increasing subsurface pressure. With the standpipe fully extended, a stopper is buoyed against the top wall to seal the openings. The unbuoyed stopper permits drainage for surface water when the standpipe is retracted.

The present invention is directed to overcoming the aforementioned problems.

SUMMARY OF THE INVENTION

In an exemplary embodiment of the invention, an expansible receptacle is disposed about a conduit penetrating an interface layer and communicates with the interior thereof. A fluid introduced to the receptacle increases the volume of the same and therein urges the walls of the receptacle into sealing engagement with the surface from which the conduit protrudes.

It is the principal object of the present invention to prevent leakage about the base of a standpipe where it joins a floor. The expanded receptacle will seal the opening about the base where leakage might otherwise occur. Any water which does leak upwardly around the base is confined within the region defined by the area of contact between the receptacle and the floor.

It is another principal object of the present invention to provide pressure relief means to avoid potential rupture of a floor or the like which might result from excessive subsurface pressure. One of the applicant's embodiments proposes the use of a resilient receptacle to completely surround the upper edge of the standpipe. When the pressure within the receptacle reaches a predetermined level, the receptacle will rupture, allowing the escape of the contained fluid. The subsurface pressure will thus be reduced to a level within the stress capability of the confining floor (i.e., concrete).

It is a further object of the invention to minimize the required vertical extension of the standpipe. Wherein an uncapped standpipe must be extended substantially upwards to accommodate high subsurface pressures without overflow, the receptacle in the present invention is expandable vertically beyond the extremity of the standpipe, and contains the water even after the water level exceeds the upper edge of the standpipe.

It is a further object to provide an unobtrusive receptacle which under normal conditions is collapsible and may be secured compactly about the standpipe by a tie string associated with the receptacle.

It is a still further object of the invention to provide one-way valve means in the base of the standpipe through which fluid collected in the receptacle can be expelled back to the subsurface region. One or more openings are provided in the wall of the standpipe and include a pivotable gate member which is manipulable between an open and closed position by utilizing the pressure differential across the wall of the standpipe.

BRIEF DESCRIPTION OF THE DRAWINGS

FIG. 1 is a perspective view of a standpipe of the prior art;

FIG. 2 is a side elevational view of a standpipe showing a preferred form of the invention;

FIG. 3 is a side elevational view of the form of the invention of FIG. 2 showing the standpipe and the receptacle partially filled with water;

FIG. 4 is a side elevational view of a modified form of the invention with a cup-shaped receptacle tied at an intermediate point on the standpipe for storage;

FIG. 5 is a side elevational view showing the form of the invention of FIG. 3 with the standpipe and the receptacle substantially filled with water;

FIG. 6 is a side elevational view of the receptacle shown in FIG. 5 including a valve mechanism in the wall of the standpipe for draining the receptacle; and FIG. 7 is a side elevational view of the receptacle shown in FIG. 5 including a modified form of valve mechanism.

DESCRIPTION

Referring in particular to FIG. 1, a conventional upright standpipe 10 is shown extending through an interface layer 12 (i.e., surface layer or floor) which might be concrete or other material which is substantially impermeable to water. The standpipe 10 is generally circular in cross-section and is secured within a collar member 14, threadingly or otherwise, which in turn is set in concrete in a bore 15 penetrating the surface layer. The standpipe is joined suitably to an underground sewer pipe 16. As is indicated in FIG. 1, a gap 18 surrounds the collar 14 and might be included to allow for expansion of the surface layer 12, or might result inadvertently from an imperfect joint between the collar 14 and the surface layer 12. When subsurface pressure is sufficiently high, a considerable amount of seepage might occur around the collar 14 and cause flooding in the area around the standpipe.

To obviate this problem, one preferred embodiment of the present invention is shown in FIGS. 2 and 3 and includes a slightly modified standpipe 19 with an expansible tube 20 of resilient material, such as rubber, neoprene, or the like, surrounding the standpipe and having a ring-shaped end bead 22 on each end of the tube. The standpipe 19 is modified by providing vents or ports 23 through the wall 24 thereof at different selected heights along the standpipe. The tube 20 is telescoped over the standpipe 19 with the lower end portion 25 doubled back inside the tube from a location close to the surface layer 12 and extends a considerable distance up the standpipe 19. One or more elastic or spring-type rings 26 are passed over the lower bead 22 and are snapped against the doubled back portion 25 to seat and to seal the lower portion of the tube 20 to the standpipe 19. The upper end portion 28 is positioned near the outlet end 30 of the standpipe and is seated and sealed to the standpipe by one or more elastic or spring-type rings 26. The tube 20 when attached to the standpipe 19 forms a closed bag or receptacle 32.

During the period of time when a storm sewer that is connected to pipe 16 is backing up and/or the subsurface soil below the surface layer or floor 12 is saturated with water under pressure, the water from the subsurface and sometimes from the sewer will begin to seep through the gap 18. It is anticipated that at about the time the gap 18 begins to accumulate water on the floor 12 the pressure in the sewer will have backed up in the standpipe 19 to a level that will begin to discharge water through the vents or ports 23 into the confined receptacle 32 of the tube 20 (FIG. 2). The water collected in the tube 20 will expand the tube, spreading out the lower end portion thereof to cover the gap 18 and seal the gap 18 against further seepage of water onto the floor. As the pressure of the water in the gap 18 increases by increased pressure below the floor, the sealing force of the tube covering the gap will also increase as a result of more water collecting in the tube 20 from the ports 23. The increased water pressure in the tube 20 will also bear against the overlapping lower portion of the tube against the standpipe to increase the sealing force therebetween.

In the event the pressure in the sewer causes the water level in the standpipe 19 to reach the top of the standpipe, the water will overflow onto the floor. At that point, it is probably better to flood the floor than to run the risk that the subsurface pressure will not only rupture the floor but also will flood the floor.

When the condition that caused the backup in the sewer and the subsurface pressure has subsided, the water remaining in the tube 20 can be drained by a valve having a tethered cap 31 removable from a plug 33 communicating with the inside of the tube 20. The plug 33 is located near the bottom of the tube so as to maximize draining of the water. The standpipe can be threaded out of the collar 14 to permit draining of any surplus water from around the standpipe into the sewer.

A modified form of the invention is shown in FIGS. 4 and 5. A cup-shaped, closed end tube or receptacle 34 is inverted over the standpipe 19. The open bottom edge of the receptacle, which includes a peripheral bead 35, is doubled back at the surface layer about the standpipe and extends up an appreciable distance along the lower portion of the standpipe. The doubled back portion of the tube or receptacle 34 is secured about the standpipe by one or more elastic or spring type elements 26, as discussed relative to the prior embodiment, so as to maintain watertight engagement therewith.

The upper portion 36 of the tube or receptacle 34 flops or spreads loosely onto the end of the standpipe 19 when no water is in the standpipe. The portion 36 may extend sufficiently upward beyond the top edge of the standpipe when filled to admit the overflow from the outlet 30 into the receptacle 34 without damaging the upper walls of the receptacle. As the water rises in the standpipe, it is bled into the receptacle through the ports or vents 23 as previously discussed relative to the embodiment in FIGS. 2 and 3.

While the tube retains the water flowing over the upper portion of the standpipe, the tube or receptacle is preferably constructed so that it will burst at a predetermined pressure which is dictated by the capacity of the surface layer 12 to withstand the subsurface pressure. As a result, when the tube or receptacle 34 bursts, the water will be flooded into the room rather than risking possible rupture of the surface layer. This pressure relief feature can be accomplished by weakening a portion of the receptacle, or, if uniform construction is desired, by choosing a material or construction which will burst at a predetermined pressure.

The construction obviates the need for as obtrusive a standpipe as was used heretofore. Additional pressure capacity is afforded by extending the fixed pipe surface itself. Under normal conditions, the bag can be collapsed and stored as discussed hereafter.

In FIGS. 4 and 5, a tie string 38 is included to facilitate storage of the collapsed receptacle as illustrated in FIG. 4, or to reduce the size of the expanded receptacle chamber. The tying means are shown integrally constructed with the tube, though they need not be. The tying means may comprise a length of string to be wrapped around the standpipe, or may comprise a peripheral drawstring. Any elastic or like functioning means may be utilized in place of the string. To drain the water that remains in the tube or receptacle 34 after the water pressure in the sewer has subsided, a valve having a tethered cap 31 is removed from a plug 33 extending through a lower side wall of the tube 34 to drain the water onto the floor or into a shallow pan.

To drain the tube or receptacle 34 and the standpipe 19 automatically when the subsurface pressure subsides, a preferred form of one-way valve mechanism, shown generally at 40 in FIG. 6, is included adjacent the bottom portion of the standpipe 19. An aperture 42 is included in the wall of the standpipe 19. A gate member 44, pivotally secured by pin 46 adjacent the top of the aperture 42, seals the aperture 42, and under normal conditions is urged by its own weight against the sidewall to the "closed" position. With water residing in the tube or receptacle 34 and a diminishing pressure in the standpipe, the water head will urge the gate 44 to the "open" position as indicated in FIG. 6 wherein the water is free to drain back to the subsurface as indicated by the path of the arrow. The aperture 42 may be located directly at the base of the standpipe whereby substantially all the water is emptied, or it may be desirable to retain a small volume of water to maintain the annular seal between the standpipe and the collar member 14, wherein the aperture is disposed slightly upwards. The tube or receptacle 34 which may be an open type as shown in FIGS. 2 and 3 or a closed type as shown in FIGS. 4-6, is secured to the standpipe by means of one or more spring elements 26.

An alternate one-way valve mechanism is shown generally at 48 in FIG. 7. The operation of the gate 50 of the valve mechanism 48 is comparable to the aforementioned gate operation of FIG. 6 with the exception of the inclusion of an offset abutting ledge 52 at the exterior of the standpipe. With the gate 50 in the closed position, the gate will align directly with the wall 24 of the standpipe and will not protrude into the interior of the standpipe as does the gate 44 in FIG. 6. The gate 50 also has the advantage that it can be assembled from outside the standpipe 19 whereupon the ledge 52 can be welded or otherwise secured to the standpipe. The tube or receptacle 34 can be an open or closed type and is secured to the standpipe at the lower end portion by means of one or more spring elements 26.

Various modifications and changes may be made with regard to the foregoing detailed description without departing from the spirit of the invention.

We claim:

1. In an apparatus comprising a standpipe penetrating a floor surface for the relief of subsurface fluid pressure, an expansible receptacle in communication with the interior of said standpipe, said expansible receptacle surrounding said standpipe adjacent its lower edge above said floor surface, wherein increased pressure within said expansible receptacle urges the same into contact with the exposed floor surface so as to make sealing engagement with said floor surface about the periphery of said standpipe.

2. The apparatus of claim 1 wherein said expansible receptacle is secured to said standpipe adjacent the lower edge of the standpipe.

3. The apparatus of claim 1 wherein said expansible receptacle encloses the upper portion of said standpipe including an upwardly facing edge of said standpipe.

4. The apparatus of claim 1 wherein said expansible receptacle communicates with the interior of said standpipe at one or more intermediate points along the length of the standpipe.

5. The apparatus of claim 1 wherein tie means are included with said expansible receptacle to secure the same about said standpipe at an intermediate position thereon.

6. The apparatus of claim 1 wherein valve means is associated with said expansible receptacle and with said standpipe for draining fluid from said expansible receptacle when the subsurface pressure is relieved.

7. The apparatus of claim 1 wherein a one-way valve means in included on said standpipe and is manipulated by the pressure differential across the walls of the standpipe between a closed position wherein fluid is confined within said expansible receptacle and an open position wherein fluid within the expansible receptacle can return to the subsurface when the pressure in the same is reduced.

8. The apparatus of claim 7 wherein said valve means comprises an aperture included in the wall of said standpipe, said aperture having associated therewith a pivotable gate member manipulable between said open and closed positions.

9. The apparatus of claim 8 wherein said pivotable gate member abuts the wall of said standpipe in the closed position.

10. The apparatus of claim 6 wherein said expansible receptacle is formed from a resilient material and wherein said valve means is formed in said receptacle near the lower portion of said receptacle.

11. The apparatus of claim 10 wherein the pressure capacity of said expansible receptacle is less than the pressure capacity of said floor surface.

* * * * *